EXPLOSIVE SWAGE DEVICE FOR TUBING

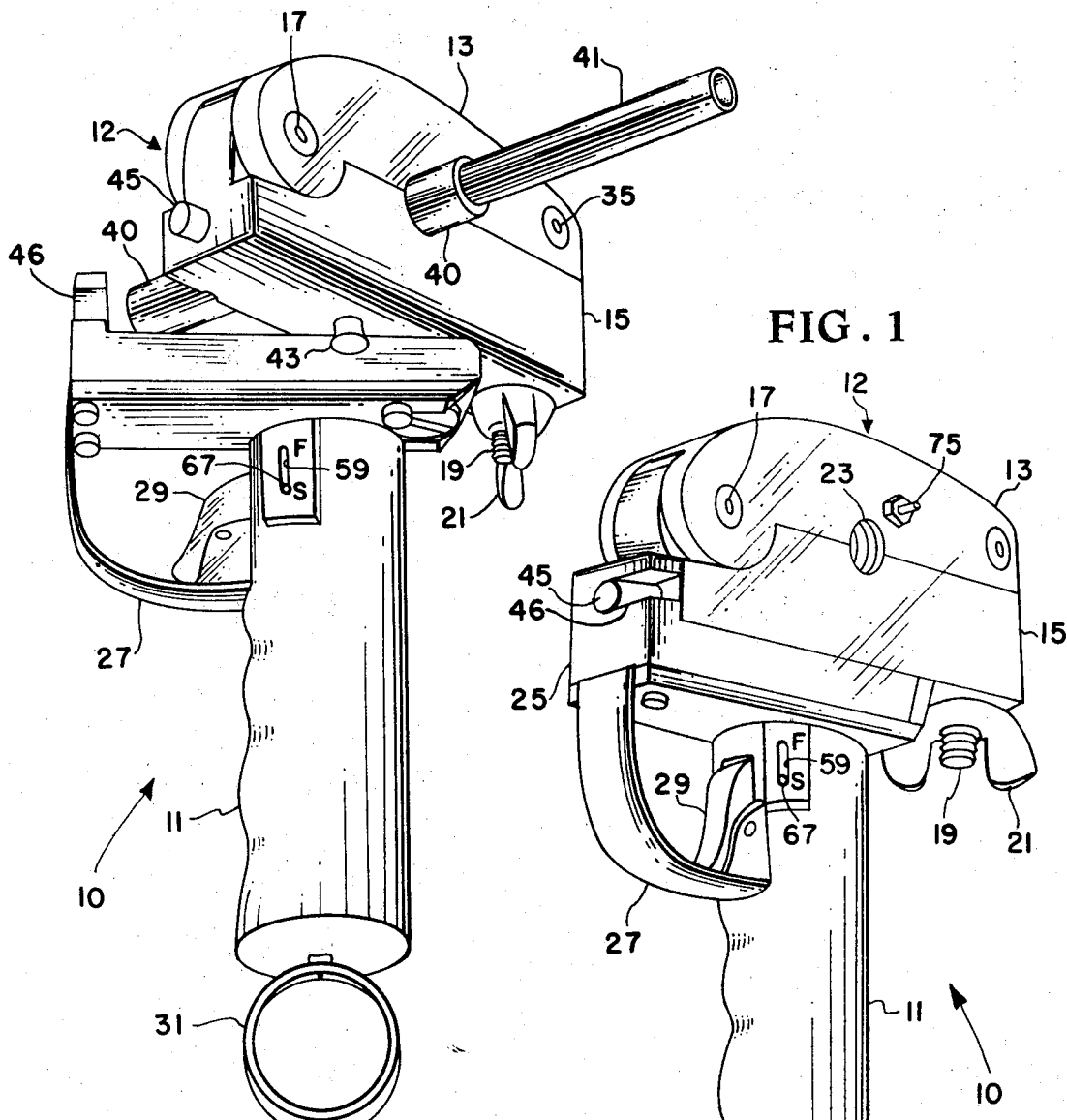
FIG. 1
FIG. 3
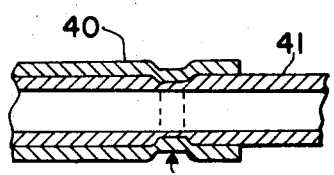
TYPICAL SWAGED JOINT
FIG. 5
INVENTOR.
DWIGHT G. McSMITH March 2, 1971   D. G. McSMITH   3,566,649

Filed Jan. 6, 1969   2 Sheets-Sheet 2

INVENTOR.
DWIGHT G. McSMITH

BY

*T. Hans McCoy*
*Wallace J. Nelson*
ATTORNEYS

United States Patent Office 3,566,649
Patented Mar. 2, 1971

3,566,649
EXPLOSIVE SWAGE DEVICE FOR TUBING
Dwight G. McSmith, Hampton, Va., assignor to
Ideas, Incorporated, Newport News, Va.
Filed Jan. 6, 1969, Ser. No. 789,268
Int. Cl. B21d 26/08
U.S. Cl. 72—56                           6 Claims

ABSTRACT OF THE DISCLOSURE

A hand tool for explosively connecting telescoped tubular members wherein the telescoped members are positioned within a supporting structure having an annular passageway therein surrounding and in fluid connection with the telescoped tubular members and means for applying pressurized forces in the annular passageway of an extent sufficient to induce an annular pressure-weld between the telescoped tubular members.

ORIGIN OF THE INVENTION

The invention was made by an employee of the United States Government and may be manufactured and used by or for the Government for governmental purposes without the payment of any royalties thereon or therefor.

SPECIFICATION

This invention relates generally to a hand tool for facilitating pressure-welding of telescoped tubular members and relates in particular to a hand tool for engaging the telescoped tubular members and an explosive cartridge for producing the pressure forces necessary to provide an annular pressure-weld between the telescoped tubular members. In spacecraft and the like there are many tubes, the complex arrangement of which necessitates numerous splices, couplings, and T's. The volume and weight of conventional fittings become quite a penalty in the restricted volume of the spacecraft. One method used heretofore to connect tubing of this type involved a sleeve which was plated and sweat-soldered. This prior art process, however, was temperature-limited, and proved difficult to inspect by normal techniques. Other prior art devices employ explosives to drive a piston whereby the piston cold-forges the two interconnecting tubular members together. However, the piston operates as a projectile which has a serious disadvantage from the standpoint of safety. For example, if the device misfires or is fired without the tubular component therein, the potential danger is considerable. It has also previously been proposed to utilize a hand tool for explosively crimping electrical connectors wherein a shaped charge is fired to explosively weld electrical connectors more permanently together after the tube parts have previously been partially crimped in interconnecting relationship.

The present invention attempts to utilize all the advantageous features of the previously described processes and hand tools while minimizing the disadvantages thereof.

Accordingly, it is an object of the present invention to provide a new and novel hand tool for providing a pressure-weld connection between two telescopic tubular members.

Another object of the present invention is a new and novel hand tool for interconnecting telescoped tubular parts.

Another object of the present invention is a novel hand tool utilizing an explosive cartridge to provide instantaneous pressure-inducing forces for interconnecting tubular telescoped members.

Another object of the present invention is a novel hand tool utilizing hydraulic fluid pressure to provide pressure-weld inducing forces for interconnecting telescoped tubular members.

Another object of the present invention is a novel hand tool for pressure welding telescoped tubular members with a minimum of work-hardening of the tubular members.

According to the present invention, the foregoing and other objects are attained in one aspect of the present invention by providing a hand tool including a housing having two mating sections hingedly connected so as to permit opening and closing thereof with an opening formed in the mating sections to provide positioning of the mating sections around telescoped tubular members when the mating sections are closed. A suitable annular passageway is provided within the housing and in fluid connection with the opening when the mating sections are in closed mating relationship with suitable structure being provided for locking the mating sections closed after positioning of the telescoped tubular members therein. A suitable chamber is formed in one of the mating sections and in fluid connection with the annular passageway with the chamber being adapted to receive an explosive cartridge therein. Suitable trigger or initiating means is provided for actuating the explosive cartridge whereby the expanded gases produced by the explosive cartridge will be received in the annular passageway and induce an annular pressure-weld between the telescoped tubular members.

A more complete appreciation of the instant invention and many of the attendant advantages thereof will be better understood when considered in connection with the accompanying drawings wherein:

FIG. 1 is a view of the hand tool according to the present invention with the mating sections in closed mating relationship and prior to introduction of the telescoped members therein;

FIG. 3 is another view of the hand tool according to the present invention with the telescoped tubular members being fixedly positioned within the mating sections of the hand tool and the mating sections pivoted in position to be loaded by the explosive cartridge;

FIG. 5 is a cross section view of two telescoped tubes connected by the hand tool shown in FIGS. 1–4.

Figure 4:
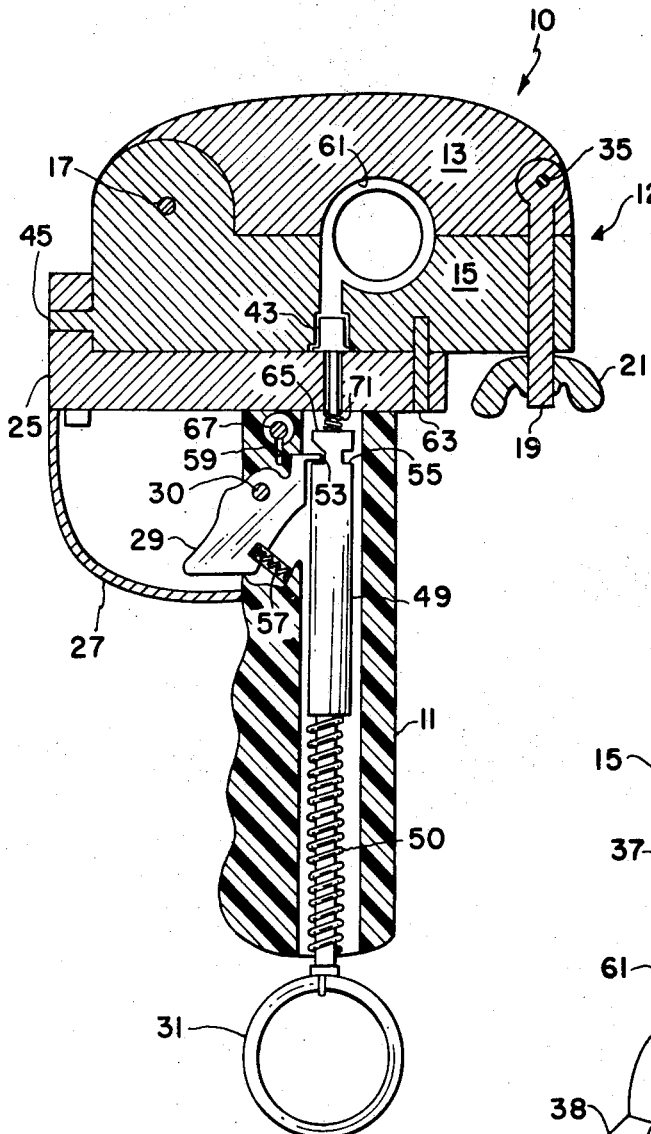
FIG. 4 is a sectional view of the hand tool according to the present invention showing the internal working components of the trigger mechanisms for actuating the explosive cartridge.

Referring more particularly to the drawings wherein like reference numerals designate identical parts throughout the several views, and more particluarly to FIG. 1, there is shown the hand tool according to the present invention and designated generally by the reference numeral 10. Hand tool 10 includes a hand grip 11 and a housing generally designated by the reference numeral 12. Housing 12 consists essentially of two mating sections designated by reference numerals 13 and 15 connected together by a suitable hinge 17. Rigid interconnection of the two mating sections 13 and 15 is maintained by a suitable bolt 19 and winged nut 21 as will be further explained hereinafter. An opening 23 is formed by the two mating sections 13 and 14 when the two sections are in closed mating relationship with this opening serving to receive the telescoped tubular members to be interconnected. Housing 12 is pivotally connected to a base plate 25 which is rigidly attached to hand grip 11. A trigger guard 27 is attached to base plate 25 and hand grip 11 by suitable conventional means and serves to protect trigger 29. A pull ring 31 serving as the cocking mechanism for trigger 29 extends from the end of hand grip 11, as will be further explained hereinafter.

Figure 2:
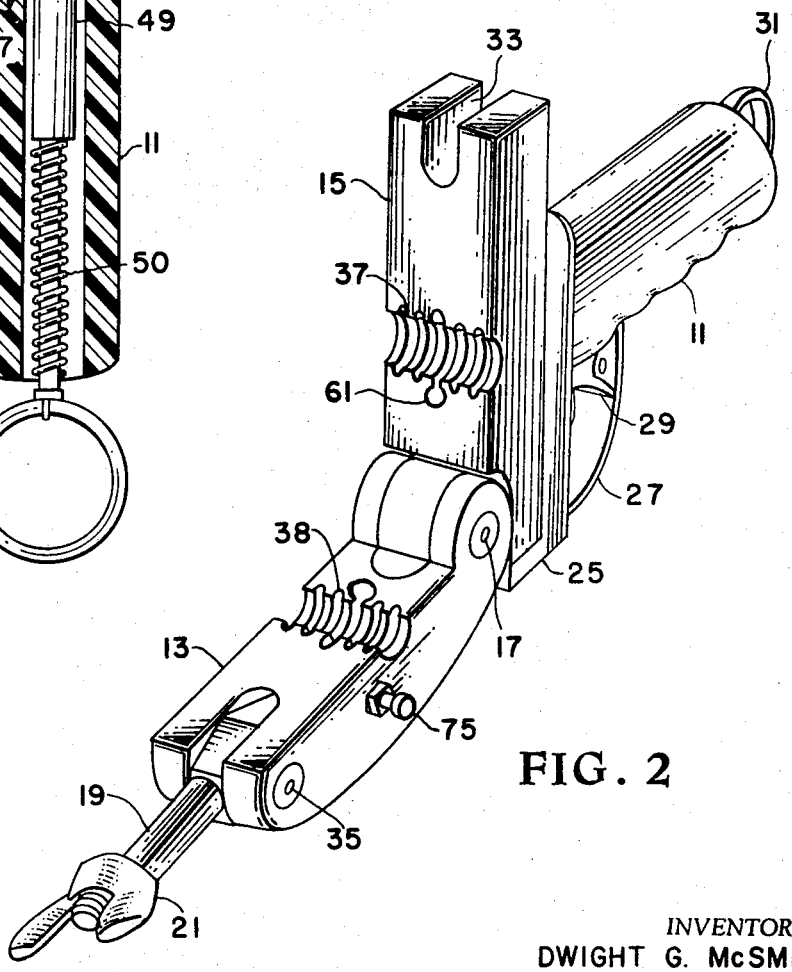
FIG. 2 is a view of the hand tool according to the present invention with the mating sections being open for introduction therein of the telescoped tubular members to be pressure-welded together.

Referring now more particularly to FIG. 2, it is readily seen that housing 12 is opened by loosening wing nut 21 and pivoting bolt 19 out of the bifurcated end 33 of the lower mating section 15. This is permitted by the pivoted connection that bolt 19 makes with upper mating section 13 and as shown more particularly in FIG. 2. Also shown in FIG. 2 the opening 23 formed by the mating sections 13 and 15 is provided with a plurality of half-circular grooves in each of the mating sections with the half-circular grooves merging with an identical groove when the mating sections 13 and 15 are in closed relationship and serving to provide openings for receiving suitable O rings or the like to insure a gas-tight seal between the housing 12 and the telescoped tubular members received within the openings 23.

Referring now more particularly to FIG. 3, hand tool 10 is shown with a pair of telescoped tubular members 40 and 41 positioned therein for connection together by the tool. As shown in this figure, housing 12 is pivoted at one end away from base plate 25 to permit the insertion therein of a suitable explosive cartridge 43. As readily apparent in this figure, lower mating sections 15, forming part of housing 12, is provided with an elongated extension 45 which is adapted to be received by the slotted end 46 of baseplate 25 when housing 12 is in the operative position directly above baseplate 25.

Referring now more particularly to FIG. 4, the operation of hand tool 10 will be better understood. As shown in this figure, hand grip 11 is provided with a central longitudinal opening extending therethrough. A firing pin 49, integral with pull ring 31 and spring biased by a suitable spring 50, is positioned within the hand grip 11 and in alinement with explosive cartridge 43. When pull ring 31 is pulled in a direction away from housing 12, firing pin 49 will be in the cocked position and maintained in cocked position by extension 53 of trigger 29. As apparent from the figure, trigger 29 is pivoted aboutpivot pin 30 and must act against spring 57 to permit release of firing pin 49. The release of firing pin 49 permits spring 50 forcefully to drive firing pin 49 against explosive cartridge 43 to initiate the same and release the gas forces thereof into circumferentially arranged groove 61 provided within opening 23. This gaseous pressure provides an instantaneous circumferential force against tubular member 40 (FIG. 3) of such intensity as to force tube 40 into a pressure-weld engagement with tubular member 41. The gases released by cartridge 43 flow in a swirl or spiral pattern due to the positioning of cartridge 43 relative to groove 61. This arrangement prevents the initial shock produced by cartridge 43 from possibly distorting the tube surface.

The operation of the invention is now believed apparent. Specifically, hand tool 10 is placed in the open position of FIG. 2 by loosening wing nut 21, pivoting bolt 19 about its pivot point 35 and opening of the housing 12 by pivotally moving mating section 13. In this condition, the two tubular members 40 and 41, telescopically disposed for interconnection with each other, are then placed within the opening 23 formed between mating sections 13 and 15 with suitable O rings being positioned in grooves 37 and 38 within the mating sections 13 and 15. Housing 12 is then pivotally closed with pivot bolt 19 being received by bifurcated opening 33 and wing nut 21 turned so as to tightly engage the base portion of mating section 15 and maintain sections 13 and 15 in mating relationship. Housing 12 is then pivotally moved about pivot pin 63 (FIG. 4) to the position shown in FIG. 3 and explosive cartridge 43 inserted therein and the housing pivoted back to the position shown in FIG. 1.

In order to actuate explosive cartridge 43, the firing pin 49 must be placed in cocked position. This is accomplished by exerting a pull force on pull ring 31 (FIG. 4) so as to overcome the pressure force exerted by spring 50 against firing pin 49. First however, sliding safety 67 must be moved from the safe to armed position along groove 59 to permit pivoting of trigger 29. A portion of firing pin 49 acts against extension 53 on trigger 29 so as to cam trigger 29 about its pivot point 30 and permit movement of firing pin 49 toward the cocked position or downward as shown in FIG. 4. It is only necessary that firing pin 49 move a relatively short distance or to such an extent that the extension 53 on firing pin 29 comes in contact with shoulder 65 on the firing pin 49. At this point, the spring force of spring 57 moves extension 53 of trigger 29 into engagement with shoulder 65 to maintain firing pin 49 in the cocked position. For firing, it is only necessary then to depress trigger 29 to such an extent as to overcome the spring forces exerted by spring 57 so as to release extension 53 from shoulder 65. Cocking and firing cannot take place unless sliding safety 67 is in the armed position shown in FIG. 4. The spring force from spring 50 will then propel firing pin 49 against explosive cartridge 43 to initiate the cartridge and release the gas-producing forces necessary to instantaneously pressure-weld tubular members 40 and 41 together. After firing, spring 71, positioned between shoulder 65 on firing pin 49 and baseplate 25, acts to insure that firing pin 49 is moved sufficiently rearward or in the downward direction as shown in FIG. 4 to permit extension 53 on trigger 29 to again engage circumferential groove 55 on firing pin 49 and again place the hand tool in safe position.

In the above-described embodiment of the present invention, the compressive forces of the gases generated by explosive cartridge 43 serve to instantaneously compress the air maintained within groove 61 to such an extent that pressure-weld forces are induced on tubular members 40 and 41. This instantaneous force serves to weld the tubes together without any substantial work-hardening of the tubular members. As an alternate embodiment to this, it is also considered within the scope of the present invention to fill groove 61 with hydraulic fluid or other incompressible fluid on which the explosive gases will act to induce the pressure-welding forces on the tubular members 40 and 41. This may be readily accomplished by pumping the hydraulic fluid through a valve 75 (FIG. 1) extending to the exterior of mating section 13 and in fluid communication with groove 61. This hydraulic fluid would be pumped through valve 75 after tubular members 40 and 41 are placed in position and prior to initiation of the explosive cartridge 43. When hydraulic fluid is not used, as in the first described embodiment of the present invention, valve 75 serves as a vent valve and may be opened or partially opened during firing of an explosive cartridge 43 to relieve excess pressure within groove 61 and normally is completely open prior to loosening of wing nut 21 to remove tubular members 40 and 41 from housing 12. In some instances the inner tubular member 41 may be provided with one or more circumferential grooves prior to positioning tubular member 40 therearound. In these instances pressure-welding of the members may be accomplished with a milder explosive cartridge 43 than when these grooves are omitted.

In one specific application of the present invention aluminum tubing was employed with the inner tubing 41 being 6061–T6 and the outer tube 40 being 6061–0. A conventional .22 caliber cartridge having power level #5 was employed to produce a charge pressure of 13,000 p.s.i.g. This combination with the hand tool of the present invention produced a pressure-weld or swage 0.014 inch deep and 0.096 inch wide that showed zero leakage when subjected to 2200 p.s.i.g. hydrostatic pressure, and a vacuum of $1 \times 10^{-6}$ torr.

Obviously, many modifications and variations of the present invention are possible in the light of the above teachings. In this respect, no specific size has been given for opening 23 formed between the mating sections 13 and 15, it being understood that the invention may be adapted to accomplish pressure-welding or swaging of any size telescoped tubular members in which an annular pressure-weld would serve as interconnections between the two members. For example, suitable inserts may be added to the illustrated embodiment to adapt tool 10 for small tubing.

Other modifications and variations will be readily apparent to those skilled in the art. It is therefore to be understood that within the scope of the appended claims, the invention may be practiced otherwise than as specifically prescribed.

What is claimed as new and desired to be secured by Letters Patent of the United States is:

1. A hand tool for explosively connecting telescoped tubular members comprising:
   a hand grip means,
   a housing supported by said hand grip means,
   said housing including two mating sections hingedly connected so as to permit opening and closing of said housing,
   means formed in said mating sections providing an opening in said housing for snugly receiving the telescoped tubular members when said mating sections are closed,
   means formed in said mating sections so as to provide at least one annular passageway surrounding and in fluid connection with said opening when said mating sections are in closed mating relationship,
   means for locking said mating sections in closed mating relationship after positioning of the telescoped tubular members therein,
   a chamber formed in one of said mating sections and in tangential fluid connection with said annular passageway,
   said chamber serving to receive an explosive cartridge therein, and
   means carried by said hand grip means for initiating said explosive cartridge whereby expanded gases produced by said explosive cartridge will be received by said annular passageway and induce an annular pressure-weld between said telescoped tubular members.

2. The hand tool of claim 1 including means permitting pivotal movement of said housing along a plane perpendicular to the longitudinal axis of said hand grip means whereby the housing may be pivoted in a first direction along the plane to expose said chamber and permit loading and unloading of the explosive cartridge and pivoted in a second direction along the plane to aline said cartridge with said means carried by said hand grip for initiating said explosive cartridge.

3. The hand tool of claim 1 wherein said means for initiating said explosive cartridge comprises a spring-biased firing pin extending the length of said hand grip means, a pull ring formed at one end of said firing pin to assist in cocking of the firing pin, and a spring-biased trigger mechanism cooperating with said firing pin so as to permit locking of the firing pin in cocked position and permit release of the firing pin when the trigger mechanism is actuated.

4. The hand tool of claim 1 including means for filling said annular passageway with a hydraulic fluid prior to initiation of said explosive cartridge whereby said fluid will be acted on by the explosive gases to exert the pressure-welding force on said telescoped tubular members.

5. The hand tool of claim 1 including means for inducing a swirling motion to the expanded gases released by said explosive cartridge.

6. A hand tool for pressure-weld connecting telescoped tubular members comprising:
   a hand grip means,
   a housing supported by said hand grip means,
   said housing including two mating sections hingedly connected so as to permit opening and closing of said housing,
   means formed in said mating sections providing an opening in said housing for snugly receiving the telescoped tubular members when said mating sections are closed,
   means formed in said mating sections so as to provide at least one annular pasageway surrounding the telescoped tubes received by said housing,
   a chamber formed in one of said mating sections and in tangential fluid connection with said annular passageway,
   explosive cartridge means for exerting a swirling motion pressurized force against said telescoped tubular members through said annular passageway of sufficient magnitude as to instantaneously pressure-weld said telescoped tubular members together.

References Cited
UNITED STATES PATENTS

| | | | |
|---|---|---|---|
| 2,367,206 | 1/1945 | Davis | 29—421E |
| 2,981,130 | 4/1961 | Broske et al. | 72—56 |
| 3,186,203 | 6/1965 | Brady, Jr. et al. | 72—56 |
| 3,341,650 | 9/1967 | Broske | 29—421 |

RICHARD J. HERBST, Primary Examiner

U.S. Cl. X.R.

29—421